United States Patent [19]
Allen et al.

[11] Patent Number: 5,121,034
[45] Date of Patent: Jun. 9, 1992

[54] ACOUSTIC RESONANCE OPERATION OF XENON-METAL HALIDE LAMPS

[75] Inventors: Gary R. Allen, Chesterland; Joseph M. Allison, Euclid; John M. Davenport, Lyndhurst; Richard L. Hansler, Pepper Pike, all of Ohio

[73] Assignee: General Electric Company, Schenectady, N.Y.

[21] Appl. No.: 579,129

[22] Filed: Sep. 6, 1990

Related U.S. Application Data

[63] Continuation-in-part of Ser. No. 320,736, Mar. 8, 1989.

[51] Int. Cl.⁵ .............................................. H05B 41/16
[52] U.S. Cl. ................... 315/246; 315/209 R; 315/DIG. 7
[58] Field of Search ............ 315/246, 247, 209 R, 315/219, 326, DIG. 7, 194; 313/623

[56] References Cited

U.S. PATENT DOCUMENTS

| | | | |
|---|---|---|---|
| 4,170,746 | 10/1979 | Davenport | 315/246 |
| 4,232,243 | 11/1980 | Rigden | 313/623 |
| 4,373,146 | 2/1983 | Bonazoli | 315/209 R |
| 4,527,097 | 7/1985 | van der Heijden | 315/246 |
| 4,705,991 | 11/1987 | Ganser | 315/209 R |

Primary Examiner—Eugene R. Laroche
Assistant Examiner—A. Zarabian
Attorney, Agent, or Firm—George E. Hawranko; Stanley C. Corwin; Fred Jacob

[57] ABSTRACT

Miniature high pressure arc lamps containing a substantial pressure of xenon, in addition to metal halide and mercury, can provide instant light at turn-on and are suitable for automotive headlamps. The high pressure of xenon aggravates convection which causes arc bowing and overheating of the envelope above the arc. By operating the lamp at high frequency within selected bands, acoustic modes are excited in the fill which straighten the arc and make the envelope more isothermal. Frequency modulation of the input can be used to broaden the band selected for acoustic operation and relax the tolerance on arc tube and circuit parameters needed for a match. Acoustic operation may also be used to effect physical displacement of the arc for beam switching.

22 Claims, 12 Drawing Sheets

ACOUSTIC RESONANCE OPERATION OF XENON-METAL HALIDE LAMPS

This application is a continuation in part of application Ser. No. 320,736, filed Mar. 8, 1989 by the same applicants, titled Acoustic Resonance Operation For Xenon-Metal Halide Lamps, and similarly assigned.

This invention relates to operation of high pressure miniature discharge lamps or arc tubes containing a fill of a radiation-emitting gas such as xenon, mercury, and metal halide vapor, on alternating current at high frequencies in acoustically active freqency ranges in order to reduce deleterious convection effects and straighten the arc. It is most useful in connection with such arc tubes that contain xenon and are mounted horizontally to serve as the light source in automotive headlamps.

BACKGROUND OF THE INVENTION

The anticipated advantages of arc-discharge automotive headlamps are an improved roadway illumination pattern by comparison with conventional filament headlamps; lower and shorter headlamp reflectors which permit improvements in aerodynamic efficiency and greater freedom in automotive styling, e.g. lowering the hood line; longer-lived lamps lasting the life of the vehicle; and lower consumption of energy which saves fuel and also reduces the thermal load on the plastic components of the headlamp housing.

An essential requirement of an automotive headlamp is ability to provide light immediately when needed, including instant relight after a momentary turn-off. U.S. patent application Ser. No. 157,436 filed Feb. 18, 1988 by Rolf S. Bergman et al., titled Xenon-Metal Halide Lamp Particularly Suited for Automotive Applications, assigned to the same assignee as the present invention, discloses a xenon-metal halide discharge lamp which combines the high efficacy and long life of the metal halide lamp with the instant-light capability of a xenon arc tube. Thus the Bergman lamp satisfies the main requirements of a discharge headlamp.

The presence of high pressures of xenon in a xenon-metal halide lamp appreciably increases gravity-induced convection, and this tends to limit the benefits achieved. Convection in the fill causes undesirable results: (1), upward bowing of a horizontal arc, while lamp optics require a straight line; (2), higher temperature of the hot spot at the envelope wall above the arc, a condition which tends to shorten lamp life; and (3), lower temperature of the cold spot at the wall under the arc, a condition which reduces lamp efficacy.

An arc may be stabilized by heat loss to the electrodes known as electrode stabilization, or to the walls, known as wall stabilization, or to both, and these are the ordinary conventional ways of overcoming convection effects. Typical instances of stabilization almost entirely by the walls are the ordinary fluorescent lamp wherein a low intensity arc through mercury vapor is confined in a 1.5 inch diameter glass tube up to 8 feet long, and the high pressure sodium street lamp wherein an intense arc through sodium vapor is confined in a 3/16 inch diameter alumina ceramic tube 10 cm. long. An example of electrode stabilization is the high pressure xenon arc lamp used for photography and signalling.

When the arc in a xenon-metal halide arc tube for a vehicle headlamp is stabilized in conventional ways, the need to avoid excessive heat load on the quartz arc tube imposes limits. With wall stabilization, the length of the arc and the dimensions of the enclosing tube must be made almost equal in size to the filament source it is replacing, so that the anticipated advantages of reduced size are lost. With electrode stabilization, the arc tube can be used as a headlamp source if the gap is kept very short in order to reduce bowing. By way of example, these restrictions may limit source efficacy to 35-40 lumens per watt in a typical 40 watt design. While this is 2-3 times the efficacy of an arc tube filled with xenon alone, it falls well short of the 70 to 80 lpw efficacy typically achievable with miniature high pressure metal halide lamps not containing xenon gas, for instance lamps as in U.S. Pat. No. 4,161,672 Cap and Lake.

In high pressure metal vapor lamps, deionization is more rapid when the size of the lamp is reduced, and this raises the reignition voltage. Cataphoresis of metal atoms in a discharge lamp is the concentration of those atoms about the cathode, resulting in their depletion from the arc and a reduction in generated radiation and/or a change in color. Because miniature metal halide lamps are subject to cataphoresis of the metal atoms under d.c. and low frequency operation (up to about 1 kHz), and also because they have unacceptably high reignition voltages at frequencies below 100 Hz, operation at higher frequencies is desirable. Higher frequency operation also results in improved efficacy since the gas discharge does not have time to cool off appreciably between half-cycles of current.

ACOUSTIC RESONANCE

When high pressure discharge lamps are operated at current frequencies higher than the usual mains frequency (60 Hz), for instance in the frequency range from 500 Hz to 1 MHz, complications arise due to standing acoustic pressure waves within the filling caused by resonances. An acoustic wave is a wave in which propagation occurs in the same direction as the particle displacement. Acoustic waves are produced whenever periodic variations in instantaneous power input into the lamp occur. Their wavelength is inversely proportional to the frequency of these variations. They may be within the range of sound or beyond it, and they are rarely audible. If some dimension of the space in which the fill is confined happens to coincide with, or approximates, the wavelength of the pressure wave, or a whole fraction or a multiple of that wavelength, resonance may cause the development of standing wave patterns within the lamp. Such patterns can cause changes in position of the arc or its glowing aureole or plume, changes in color of the emitted light, and/or unstable arcs resulting in flicker and sometimes extinction of the arc.

Up to the present, acoustic resonance effects in arc discharge lamps have been considered entirely undesirable, and acoustic resonances have been deemed conditions which must be avoided.

PRIOR ART TREATMENT OF ACOUSTIC RESONANCE

U.S. Pat. No. 4,940,904 issued on Feb. 27, 1990 to J. Allison et al., assigned to the same assignee as the present invention, discloses a ballast circuit for operating miniature metal halide lamps, including Bergman's xenon-metal halide lamp. It eliminates cataphoresis and high reignition by operating in the frequency range from 1 to 10 kHz, and avoids the instabilities due to acoustic resonances by forcing a square wave of current through the lamp. The square wave of current is associated with a square wave of voltage in phase with it, so that the instantaneous power into the lamp (current-×voltage) is substantially constant in time. Since there are no time-varying changes in power affecting arc temperature, no acoustic resonance effects are induced. However the shortcoming to this approach is that the undesirable effects of gravity-induced convection are still present.

U.S. Pat. No. 4,170,746 to John M. Davenport was seeking to overcome the problem of very high reignition voltages in the miniature mercury metal halide lamps of U.S. Pat. No. 4,161,672 Cap and Lake operated at the usual power line frequency of 60 Hz. Raising the frequency reduced the reignition voltage but arc instabilities due to acoustic resonances were encountered. Davenport found ways to avoid these resonance effects, based on his discovery of resonance-free regions or windows in the current frequency range between 20 and 50 kHz. By shifting the operating frequency up into this range and confining it to one of these stable windows, he achieved stable resonance-free operation with low reignition voltage. These stable windows are relatively narrow, roughly 5 kHz wide, and demand a tight frequency tolerance from the ballast.

In solid state ballast circuits for discharge lamps, it is known to operate controlled switching means such as a power transistor at a variable high frequency chopping rate to shape the lamp current. For instance, the switching frequency may be varied from approximately 10 kHz to 30 kHz and back to 10 kHz over a complete power cycle, that is over a 60 Hz half-wave of current. Such circuits are described in U.S. Pat. No. 3,890,537 Park et al, and U.S. Pat. No. 4,042,856 Steigerwald. The circuit in the former is intended for operation of high pressure mercury vapor street lamps, and in the latter, for operation of high pressure sodium vapor street lamps. These are lamps with vertical arcs in which gravity-induced convection is not a problem. As a result of the automatic sweeping of the chopping frequency and of the low ripple amplitude, acoustic resonance effects are avoided.

OBJECTS OF THE INVENTION

The object of the invention is to provide an improved method of operation of, or an operating system for, lamps containing a radiation-emitting gas such as xenon at a substantial pressure, plus mercury and metal halide vapors, which reduces or eliminates the gravity-induced convection effects that lower efficacy and shorten life in such lamps.

Another object is to provide an improved method of operation for a xenon-metal halide lamp containing the several atmospheres of xenon required for instant light, and arranged with the arc horizontal to serve as the light source in a headlamp, which method straightens the arc and makes for a more isothermal envelope improving efficay and assuring long life.

Yet another object is to provide a method of operating such a lamp with its arc horizontal, which method permits wide tolerances in needed arc tube and ballast parameters, and is effective to straighten out bowing of the arc, to lower the hot spot temperature above the arc, and to raise the temperature of the cold spot below the arc.

Still another object is to utilize similar acoustic resonance phenomena as are used in arc straightening, to achieve beam-switching in an automotive headlamp.

SUMMARY OF THE INVENTION

We have found that in miniature high pressure xenon-metal halide lamps operating with the arc horizontal, the deleterious effects of gravity-induced convection may be reduced or eliminated by using a.c. lamp operating currents at frequencies in preferred bands within the range extending from about 5 kHz to 1 MHz. The purpose of such high-frequency operation is to excite preferred acoustic modes which reduce gravity-induced convection, and at the same time to avoid other modes which cause instabilities. The preferred bands are those in which the acoustic perturbations compel gas or vapor movement patterns in the fill which reduce or counter gravity-induced convection. The bands to be avoided are those that drive the arc asymmetrically toward the wall, or that entail unstable movement of the arc or of the plume or luminous aureole surrounding it, causing flickering or arc extinction in the extreme case.

In all of the miniature arc tube designs which we have studied, we found at least one and usually several frequency bands or windows, in which arc-straightened operation was observed. The straightening of an arc in this fashion, that is by excitation of selected acoustic modes, may be termed acoustic straightening, and this mode of lamp operation is sometimes referred to as acoustic operation.

By suitable choice of operating frequency, the arc may be changed from bowed to partly straightened, or to fully straightened. This occurs with physical displacement of the arc, allowing the phenomena to be used to accomplish beam-switching in automotive applications.

We have also made a surprising and very valuable supplementary discovery. The bands or windows of frequencies in which arc-straightening occurs are relatively narrow, for instance a maximum bandwidth of 10% of the ballast output frequency, typically a width of 3 to 4 kHz for a ballast frequency of 40 kHz. We have found that the imposition of suitable frequency modulation on the ballast driving frequency can greatly broaden the width of the windows for arc-straightened stable operation, for instance to 30% of the center frequency of the ballast. Thus frequency modulation of the center driving frequency can be used to greatly relax the tolerances on the arc tube and ballast circuit parameters needed to ensure a match between the stable window of a particular lamp and the center frequency of its ballast, thereby lowering manufacturing costs.

DESCRIPTION OF DRAWINGS

In the drawings:

FIG. 10 shows schematically the input converter control logic circuit.

FIG. 11 similarly shows the control logic circuit for the output inverter.

FIG. 12 shows schematically a timer circuit controlling current for instant light at turn-on.

DETAILED DESCRIPTION

The high pressure xenon-metal halide arc discharge combines the efficacy and long life of an arc in metal halide vapor with the instant light output of an arc in xenon gas. But, as previously mentioned, it is subject to limitations resulting from the high xenon pressure needed to assure an adequate level of instant light. The initial light output is proportional to discharge current and to xenon density. Since the efficacy of the xenon discharge is lower than that of metal halide, more power and appreciably more current are required to provide comparable lumens. But a constraint on current to the electrode results from the need to operate at high current for short times at turn-on and immediately after, and at relatively low current during a prolonged run. We have found current ratios of up to about 8:1 to be practical as regards the effect on electrode life. In practice the need for reasonable electrode life imposes a limit of a few amperes on the current, so that a high xenon pressure is needed for the desired instant light level. This has aggravated the convection problem.

ARC TUBE

Figure 1:
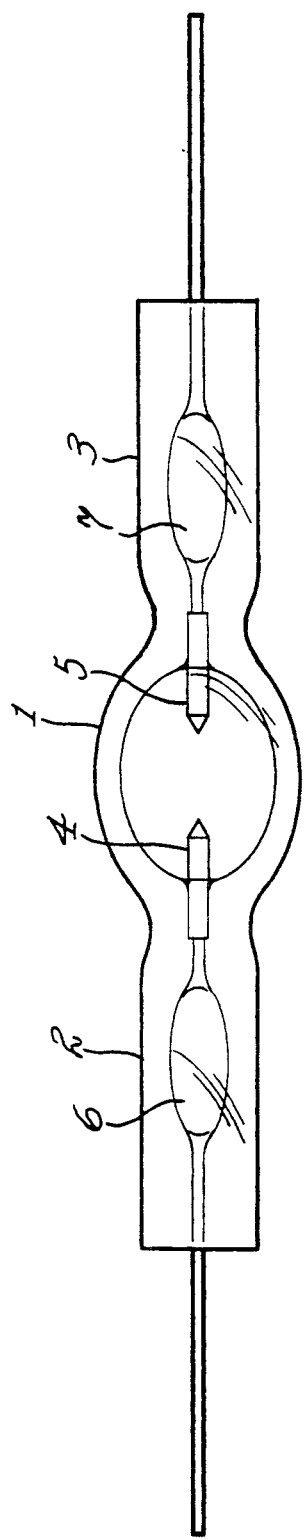
FIG. 1 illustrates a miniature xenon-metal halide arc tube or lamp, positioned for horizontal arc operation as it would be in an auto headlamp.

Our invention arose from studies of acoustic resonance modes in miniature high pressure xenon-metal halide lamps having envelope volumes not exceeding approximately 1 cubic centimeter such as illustrated in FIG. 1. As shown, the arc tube 1 is made of quartz or fused silica, suitably formed by the expansion and upset of the tubing while heated to plasticity. The neck portions 2,3 are formed by necking down the heated tubing through surface tension. The preferred envelope shape is a prolate spheroid or an ellipsoid of revolution, suitably 7 mm×9 mm. Pin-like electrodes 4,5 of tungsten are positioned on the major axis of the envelope and their distal ends define an inter-electrode gap of approximately 2 to 3 mm. The pins are joined to foliated molybdenum inleads 6,7, preferably by a laser-welded butt joint as described in U.S. Pat. No. 4,136,298 to Richard L. Hansler. The root ends of the tungsten pins and the joints are embedded in the fused silica which assures rigidity, and the foliated portions of the molybdenum inleads are wetted by the silica in the necks which assures hermetic seals.

By way of example, the fill contained in the lamp comprises mercury, metal halide salt consisting of 95% sodium iodide and 5% scandium iodide by weight, and xenon gas. The quantity of mercury is chosen such as will result in a pressure of 15 to 20 atmospheres when totally vaporized under operating conditions. The mercury pressure determines the voltage drop across the lamp when fully warmed up, and the quantity is adjusted for the desired drop across the electrode gap, for instance 45 volts for a steady-state current of 0.7 ampere across a 2.5 mm gap. During the first second of lamp warmup, the lamp typically operates at 20 volts and 5 or 6 amperes. This is sufficient current to establish a spot mode operation, since glow mode starting is difficult due to the high xenon fill pressure. U.S. Pat. No. 4,574,219 to John M. Davenport may be referred to for more information on glow mode starting. An excess of halide salt is provided, that is, more than is vaporized, for instance 2 mg for this size of arc tube.

Xenon is used for the radiation-emitting gas because its emission is in the visible. Other gases could of course be used in similar fashion if radiation in spectral bands outside the visible were desired. The radiation-emitting gas will porvide a substantial proportion of the total pressure in the lamp during continuous operation, for instance 25% or more. For testing purposes we made lamps with xenon fill pressures ranging from 0.5 up to 10 atmospheres, and finally selected 5 to 7 atmospheres as preferred for use with our invention in this design, as is explained below.

ARC STRAIGHTENING

Figure 2:
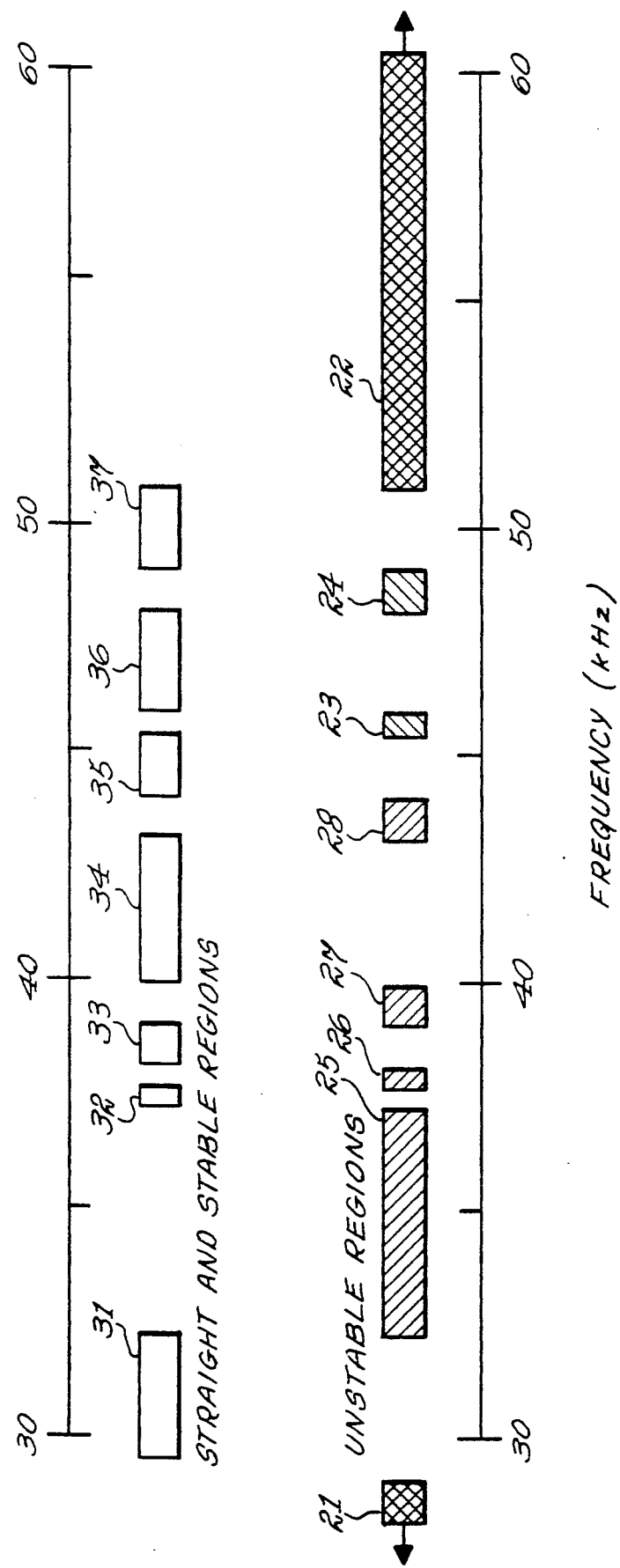
FIG. 2 is a bar chart or plot of the regions or windows of different acoustic modes encountered while operating the lamps on AC at different current frequencies in the range from 30 to 60 kHz.

Referring to FIG. 2, the windows or frequency bands in which different acoustic modes were encountered while operating the lamps on AC in the frequency range from 30 to 60 kHz are shown. The frequency scales in FIGS. 2 and 3 reading 30 to 60 kHz give alternating current or voltage frequencies. The frequencies of the input power pulsations which cause the acoustic waves will of course be double the indicated frequencies, and appropriate scales would read 60 to 120 kHz. The various modes include, in addition to the arc-straightening ones, several causing different kinds of instability. The unstable modes are indicated by the different styles of hatching as follows.

Cross hatching, shown at 21 below 29 kHz and at 22 above 51 kHz, indicates arc instability wherein the arc normally extending between the electrode tips is forced to the wall. This kind of instability can be catastrophic because if operation in this mode is continued, the arc may melt through the quartz. Or alternatively the arc may extinguish, probably from the increase in voltage drop resulting from the lengthened arc path.

Hatching leaning to the right, shown at 23 and 24, indicates an instability which causes flickering, sometimes termed aureole or plume instability. The aureole is a reddish glow due to thermally excited radiation from the sodium in the hot vapor which surrounds the arc. The arc remains stationary but the aureole moves about producing the flickering that is observed in a plume instability.

Hatching leaning to the left, shown at 25, 26, 27 and 28, indicates arc bowing or twisting into a serpentine shape, or oscillations, sometimes harmonic, between straight and bowed arcs at frequencies observable to the eye and again causing flickering.

PREFERRED WINDOWS

The stable frequency bands in which the acoustic modes when excited cause perturbations which symmetrically force the arc to the center of the arc tube rather than asymmetrically toward the wall, are the regions between the unstable regions. In the upper part of FIG. 2, they are indicated by the open boxes 31 to 37. These are the preferred bands in which we found straightening of the arc, and which we intend for acoustic operation in accordance with our invention. Operation at a frequency in any of the hatched windows in the lower part of FIG. 2 will excite modes entailing instabilities and is precluded.

The straightening of the arc appears to be due to the dominance of horizontal acoustic motion over the vertical convection which otherwise bends the arc upward. This motion may be thought of as a back and forth movement or sloshing of the fill gas and vapors along the major axis of the spheroid. The effects of acoustic operation can be dramatic: gravity defeated to the extent of achieving a straight arc in horizontal operation, maximum wall temperature reduced 200 C. and lamp efficacy doubled, as detailed below.

EFFICACY BENEFITS OF ACOUSTIC OPERATION

Figure 4:
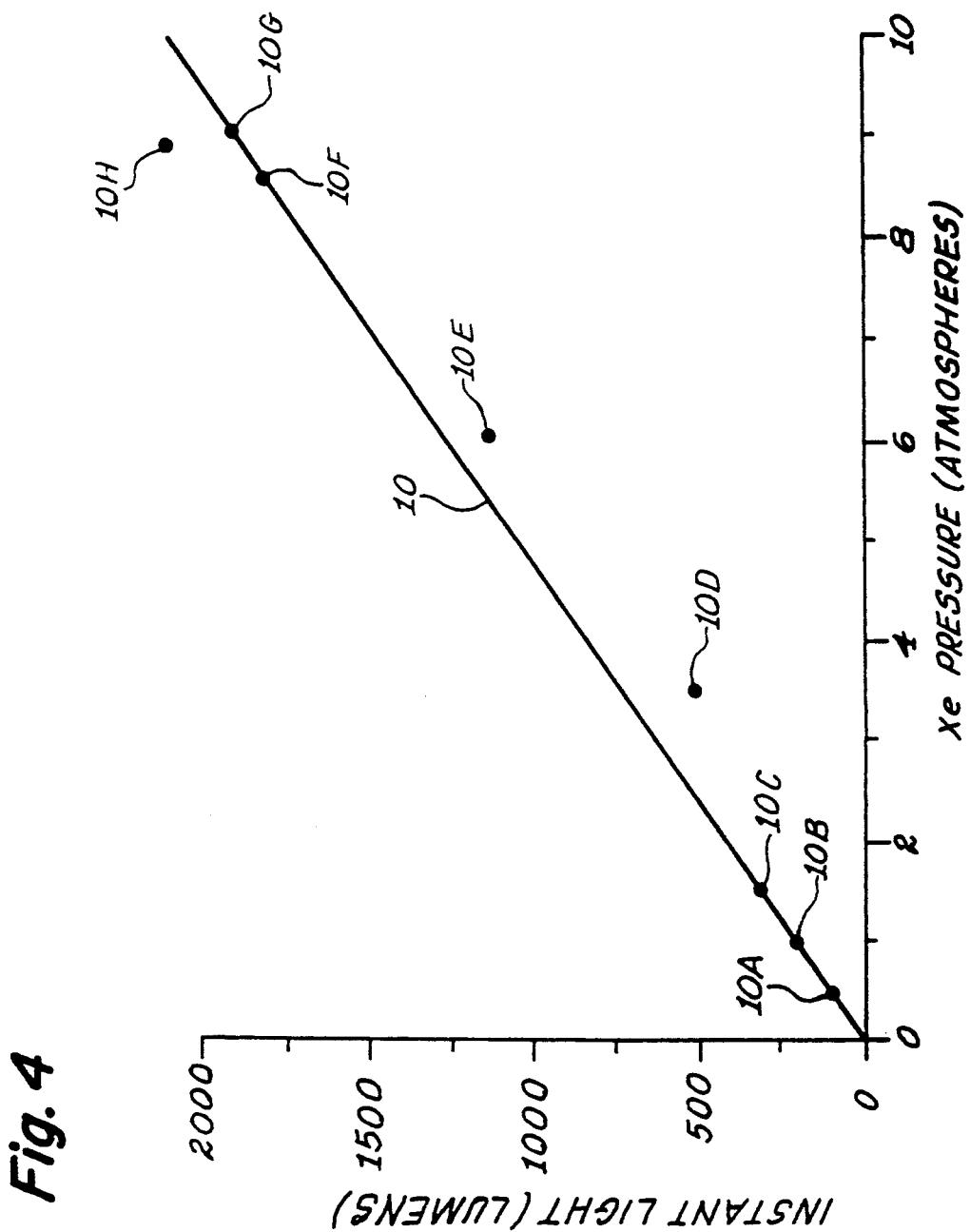
FIG. 4 shows instant light as a function of xenon fill pressure at 4.5 amperes in 7 mm×9 mm prolate spheroid arc tubes having approximately 4 mm arc gaps.

In FIG. 4, points 10A through 10G represent the instant light output in lumens as a function of xenon fill pressure in atmospheres, for several xenon-metal halide arc tubes of the kind shown in FIG. 1, in which only the xenon fill pressure was varied. The lamps were operated with a current of 4.5 amperes in a conventional non-acoustic way. Referring to line 10 which represents the best fit of the points, a xenon fill pressure of 7 atmospheres is needed in order to yield the instant light output of 1500 lumens desired for an automotive headlamp. The xenon pressure of 7 atmospheres at room temperature increases 5 fold to 35 atmospheres at operating temperature. Thus the xenon pressure is comparable to that of the mercury in the metal halide discharge, in this case close to double, with the result that convection in the xenon-metal halide lamp is much stronger than in a miniature metal halide lamp for general illumination.

Figure 5:
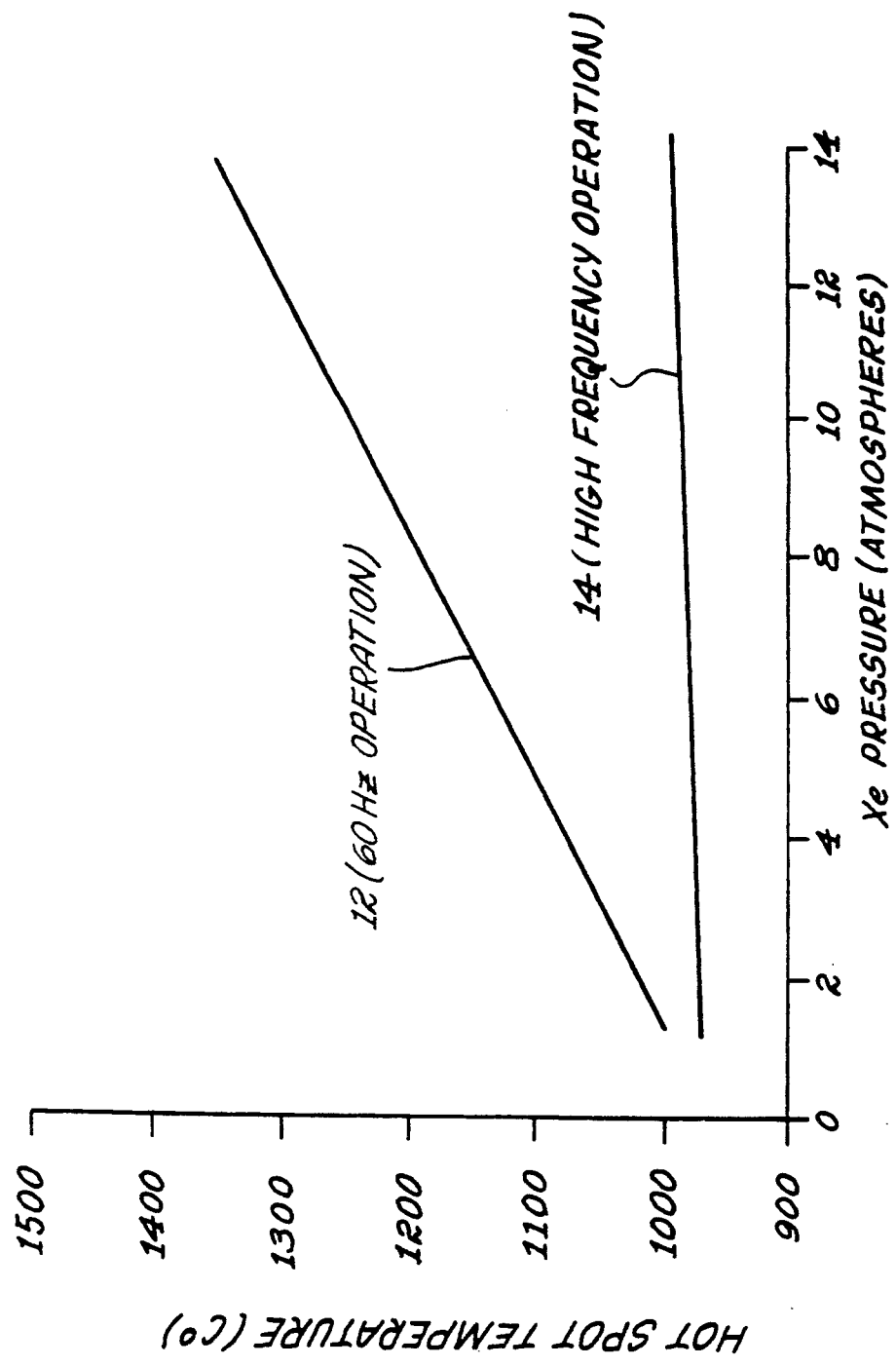
FIG. 5 compares the hot spot temperature of the arc tube as a function of xenon pressure for 60 Hz square wave operation, with that for arc-straightening operation at high frequency according to our invention.

The greater severity of convection effects with higher xenon fill pressures in the xenon-metal halide lamp, in particular the higher hot spot temperature resulting from higher convection velocity of hot gas from the core of the arc, is readily seen in FIG. 5. Curve 12 is a plot of hot spot temperature against xenon fill pressure for the same lamps conventionally operated, that is, operated without benefit of the present invention and without excitation of any acoustic mode. Conventional operation here may be taken to include not only 60 Hz ac operation, and also square wave operation at 60 Hz or higher to facilitate reignition. Curve 12 indicates that the hot spot temperature exceeds 1000 C. for xenon pressures above about 2 atmospheres. The 1000 C. point is taken as an upper limit because above it, the quartz of which the arc tube walls are made deteriorates, and the lifetime of the lamp is shortened. Also the strong convection inordinately cools the bottom of the arc tube where the pool of molten halides resides, lowering the halide vapor pressure, and consequently the efficacy of the lamp.

Curve 14 in FIG. 5 shows that, by contrast with the conventional case, when the lamps are operated in accordance with our invention at a frequency which excites the preferred acoustic straightening modes, very little increase in hot spot temperature with increase in xenon fill pressure occurs. Even at 14 atmospheres of xenon, double the target fill pressure of 7, the 1000 C point is not exceeded. The fact that there is so little rise confirms our belief that the acoustic pattern has overwhelmed gravity-induced convection.

ISOTHERMAL ENVELOPE

Furthermore, we have found that at a given pressure of xenon, acoustic operation, that is, operation in a preferred mode which straightens the arc, makes for a more isothermal lamp envelope. Thus greater power input and higher wall loading are possible without overheating any part of the lamp, resulting in higher efficacy.

Figure 6:
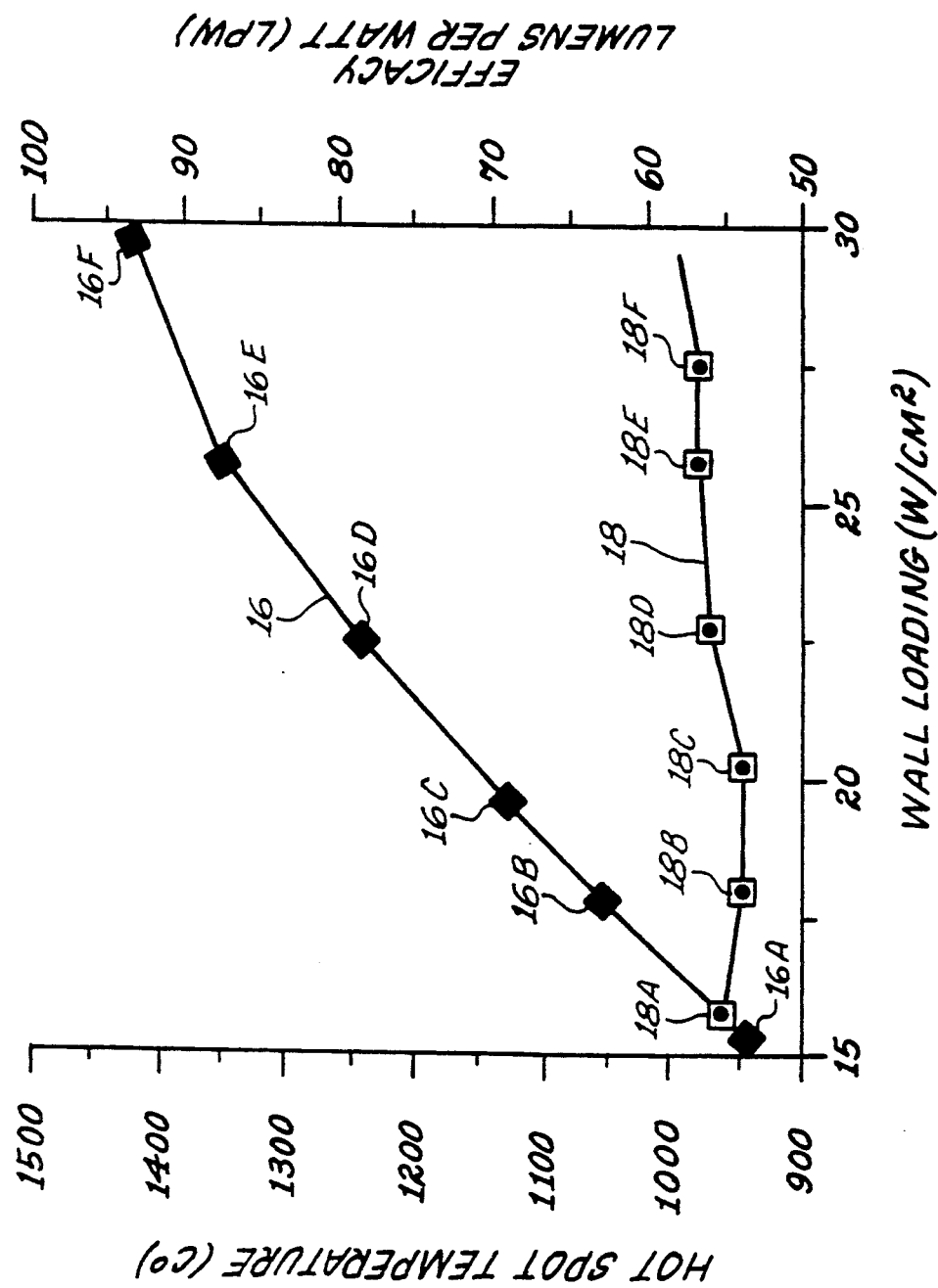
FIG. 6 shows hot spot temperature and luminous efficacy as a function of wall loading in a 6 mm×8.5 mm prolate spheroid arc tube with a 3.4 mm gap between electrodes and 10.3 atmospheres of xenon, operating with acoustically straightened arc according to our invention.

The foregoing is seen in striking fashion in FIG. 6, wherein points 16A to 16F show the rise in efficacy, measured in lumens per watt, for acoustic operation as the wall loading is increased over the range from 15 to 30 watts per $cm^2$. Wall loading is the power into the lamp averaged in watts per square centimeter over the arc tube wall surface. By contrast, points 18A to 18F which give the hot spot temperatures in degrees centigrade occurring over the same range of wall loading, show barely any rise. Obviously the hot spot temperature has reached a plateau, and the extra heat from increase in wall loading is being dissipated away from the arc and toward the ends of the lamp by the acoustic mode in the lamp.

It will be observed that the previously targeted efficacy of 70 to 80 LPW is readily achieved with a wall loading of 20 to 22 W/cm2 at a conservative hot spot temperature of about 960 degrees C.

BEAM SWITCHING

When the arc is acoustically straightened, the center of the concentration of light which the arc generates is displaced from one location to another within the lamp. By arranging the lamp within the reflector of a vehicular headlamp so that one location is at the focal point for low beam illumination, and the other at the focal point for high beam, it is possible to switch from low beam to high and vice versa merely by shifting frequency. The choice of frequency will be made in respect of the available windows (FIGS. 2 and 3), to change the arc from a bowed or slightly bowed condition to substantially straight.

In the circuit suitable for operating a lamp according to the invention which will be described in connection with FIGS. 9 to 12, the center frequency of the current supplied to the lamp may be shifted by a fixed amount, for example from 40 kHz for a straight arc to 30 kHz for an arc bowed upward, by switch S1 in FIG. 11, in order to effect beam switching. This approach to beam switching has the advantage that even in the slightly bowed configuration of the arc, the lamp operates more isothermally.

FREQUENCY MODULATION

The widest stable band available for arc-straightening at any one given operating frequency is less than about 10% of the frequency of the input AC current or voltage to the lamp. For instance, referring to FIG. 2, it is seen that the stable region represented by open box 34 extends from 40 to about 43 kHz, and is about 3 kHz wide, not quite 8%. The exact location of the stable window of any one particular arc tube will be affected by almost all of its parameters: dimensions, envelope shape, electrode insertion length, off axis run-out of the electrodes, sealing cavities, gas fill pressure, and mercury and metal halide charge. It will also be affected by the input power into the lamp and by the cooling provisions which determine temperature and vapor pressure. The output frequency of the individual ballast will also vary due to manufacturing tolerances. Thus it must be expected that a substantial percentage of lamps and ballasts will fail to match at the intended stable band. The result of course would be a high proportion of expensive parts-reworking or rejected scrap in manufacture.

Fortunately we have made the supplementary discovery that by modulating the frequency of the lamp current or signal, a much broader window of stable arc-straightening operation can be obtained. With a suitable choice of parameters, the stable window width is expanded to as much as 30 to 50% of the carrier frequency.

For convenience, the frequency of the input AC, or its center frequency with respect to any frequency modulation, will be referred to as the carrier frequency F. The applied frequency-modulated input voltage can be represented as follows for the case of sinusoidal waveforms (Ref. A. Hund, Frequency Modulation, McGraw-Hill, 1942, p 14):

$$V_t = V_m \cdot \sin \{2\pi F \cdot t + DF/f \cdot \sin 2\pi f \cdot t\}. \quad (1)$$

where
- $V_t$ is the instantaneous voltage at time t,
- $V_m$ is the peak voltage,
- F is the carrier or center frequency,
- DF is the maximum frequency deviation from F, and
- f is the modulation frequency.

For simplicity the carrier frequency waveform will be deemed sinusoidal as in Eq. (1) above, but we have found that such is not necessary. It may alternatively be triangular, or a waveshape between sinusoidal and triangular. However it may not be a square wave, since a square wave in voltage tends to produce constant power with the result that acoustic excitation is avoided. In similar vein, the modulating frequency waveform need not be sinusoidal as in Eq. (1), and in fact, a triangular or sawtooth waveform is preferred as will be discussed below.

Without frequency modulation (DF=0), a horizontally burning arc is observed to be straightened only when the carrier frequency is put in one of the preferred bands or windows indicated by open boxes 31 to 37 in FIG. 2, wherein horizontal acoustic motion prevails over vertical convection which otherwise bends the arc upward. As previously stated, only those bands may be used in which the perturbations symmetrically force the arc to the center of the arc tube. The others interspersed between them wherein the arc or the mantle are unstable, such as hatched boxes 21 to 28 in FIG. 2, must be avoided.

Figure 3:
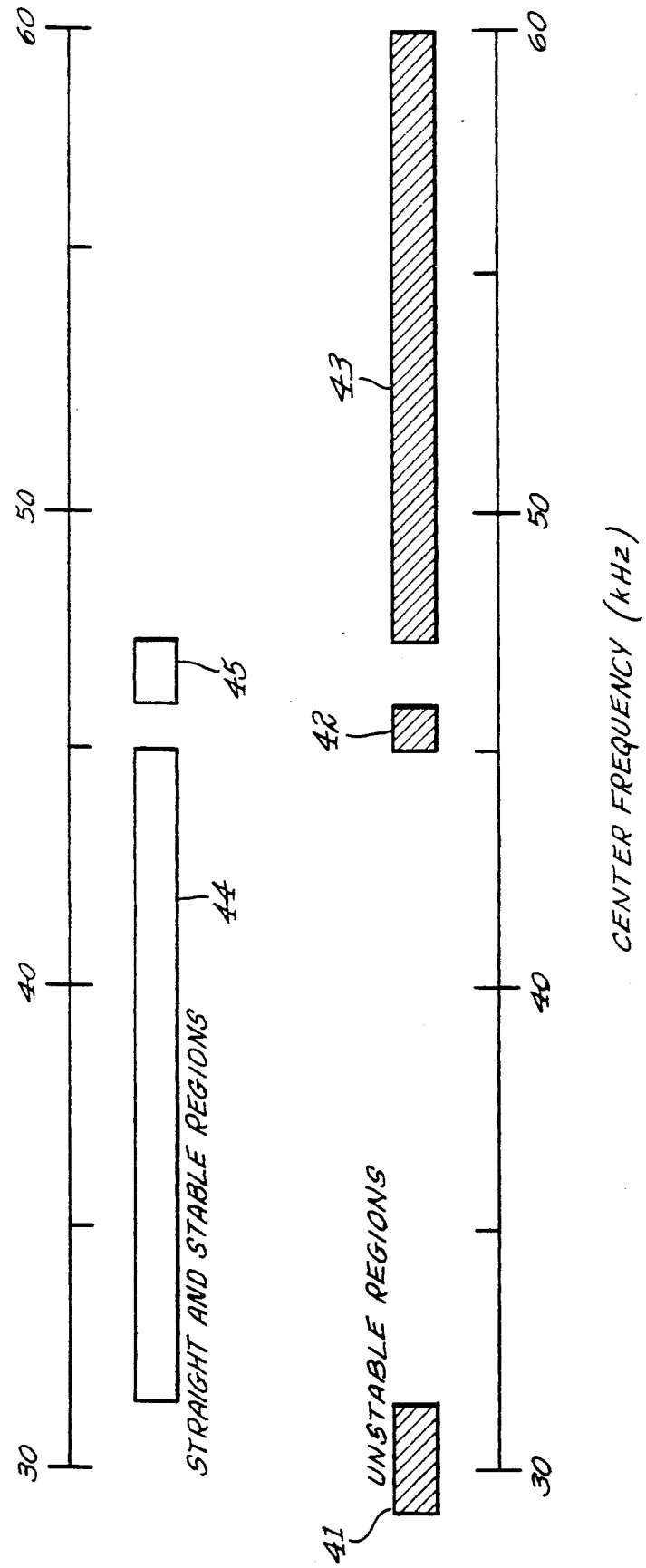
FIG. 3 is a bar chart similar to FIG. 2 showing the changes in the regions or windows resulting from frequency modulating the operating center frequency in the same range.

When frequency modulation is applied to the carrier, a remarkable modification of the frequency bands for straight stable arcs occurs. This is shown in FIG. 3 which is a plot of the lamps' response when the oscillator controlling the input current or signal to the lamp, is set successively at various center frequencies over the frequency range from 30 to 60 kHz. At every data point, the center or carrier frequency was swung or deviated an amount DF equal to 8 kHz, at a rate f of 370 Hz, in a triangular sweep pattern or waveform. The plot, which may be considered an acoustic response map, has been simplified to show only two kinds of response, hatched boxes 41, 42 and 43 representing unstable regions, and open boxes 44 and 45 representing straight and stable regions.

PREFERRED FM RANGES

The region of particular interest is the open box 44 representing a stable frequency band extending from 31 to 45 kHz. For a straight stable arc, the carrier frequency F may be set within this band, together with a deviation DF which allows the instantaneous carrier frequency to remain within it. The primary determinants of the frequency band in which the carrier or center frequency F must be placed in order to achieve the desired stability and arc straightening are of course the arc tube dimensions, and secondarily the other parameters previously mentioned. For lamp sizes of interest for vehicular headlamp applications, the stable frequency band will be found in the range from 20 kHz to 80 kHz.

As regards frequency modulation of the carrier or signal, we have determined the preferred range of frequency swing or deviation DF to be from 7 to 20% of the carrier frequency F, and the preferred range of the modulating frequency f to be from 1 to 5% of the carrier frequency F. These preferred ranges may conveniently be expressed as follows:

$$0.07 < DF/F < 0.20. \quad (2)$$

and $$0.01 < f/F < 0.05. \quad (3)$$

The carrier frequency F will of course depend on the size of arc tube, scaling inversely with its dimensions. For example good operation was obtained in a prolate ellipsoidal arc tube design having an inside major diameter of 10.0 mm and minor diameter of 5.8 mm. The frequency excursion DF was 4.2 kHz and the modulation frequency f was 0.7 kHz. A straight stable arc was obtained over the carrier frequency range of 32 to 48 kHz.

STABILITY BROADENING EFFECT

We believe that the stability broadening effect of frequency modulating the input AC signal to the lamp which we have discovered is rationally explainable and can be understood by considering both the frequency domain and the time domain.

Figure 7:
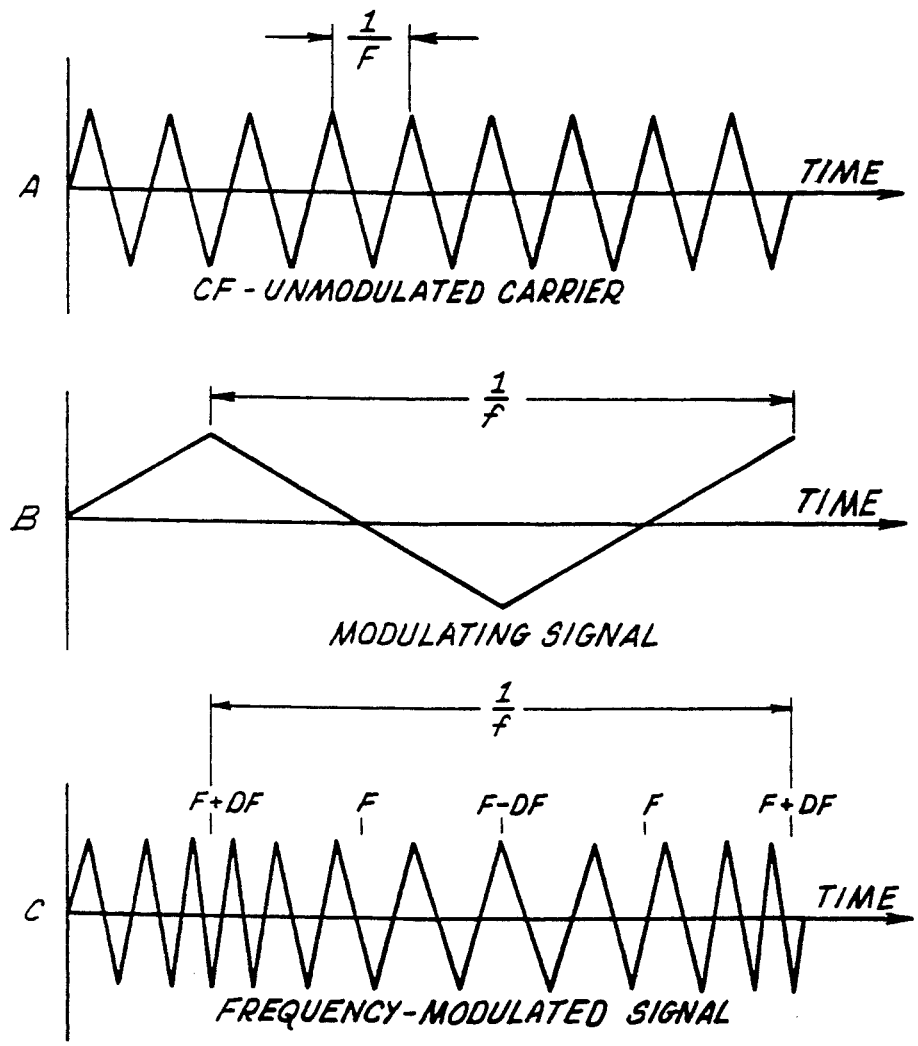
In FIGS. 7, A, B, and C are diagrams representing in simplified form an unmodulated carrier wave, a modulating signal, and a frequency modulated wave which may be supplied to the arc tube in accordance with the invention.

Referring to FIG. 7, curve A is representative of an unmodulated carrier signal of fundamental frequency F, drawn as a triangular wave for simplicity. If it were sinusoidal, it would be represented by $V_t = V_m \cdot \sin 2\pi F \cdot t$, which corresponds to the first part of Eq.(1) in which the time interval between peaks is 1/F. Curve B represents the modulating frequency f appearing in Eq. (1), and its time interval is 1/f. Curve C represents the frequency modulated wave of Eq. (1) in triangular form, and simulates the shape of the wave as it passes through the frequency maximum at (F+DF), the mean frequency at F, and the minimum at (F−DF).

Figure 8:
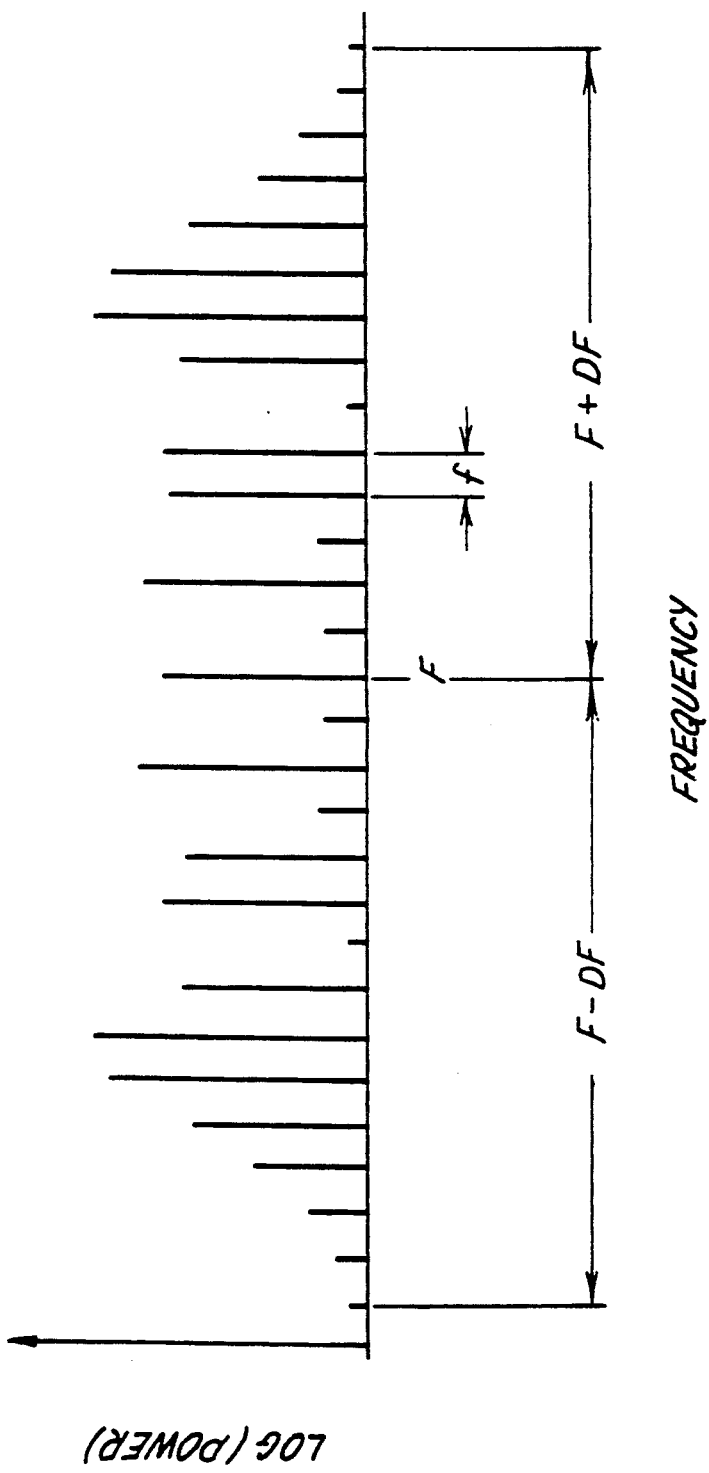
FIG. 8 shows a typical frequency modulation spectrum of the power to be applied to a xenon-metal halide lamp in accordance with the invention.

As is well known (Ref. A. Hund op cit p 16-28), the frequency modulated carrier represented in time by Eq. (1) can be resolved in frequency by a spectrum such as depicted in FIG. 8. Examination of FIG. 8 shown that the electrical input power or signal is distributed over many discrete frequencies $F_f$ throughout the range $(F-DF)$ to $(F+DF)$. When the modulation index $DF/f$ is chosen much greater than 1, the discrete frequency components are separated by amounts equal to the modulation frequency f as shown. The half-width at half-maximum (corresponding to the 3 dB points) of the spectrum roughly equals DF. This means that the power in sidebands more remote from the carrier than the swing or deviation DF is inconsequential and may be ignored.

Considering now the frequency domain, if most of the power represented by the sidebands $F_f$ shown if FIG. 8, is delivered at stable frequencies, that is. at frequencies hitting within the preferred bands represented by the open windows 31 to 37 in FIG. 2, then instability of the arc can be avoided. In order to spread the power sufficiently, the width, 2 DF, of the frequency spectrum must exceed the width of the unstable frequency bands which are typically a few kHz wide as shown in FIG. 2. However it must not exceed the width of the region where straight, stable operation is found, typically 20 to 40 kHz wide. Furthermore, if the modulating frequency f is too large, then there will be too few sidebands or frequency components, and potentially too much power in any sideband that may hit in an unstable band or window. The smaller the value chosen for f, the larger will be the number of frequency components which deliver the power, and the less the likelihood that an instability will be excited. However there is a lower limit on the allowable modulating frequency f, as discussed below.

Considering now the effect of frequency modulation in the time domain, the applied frequency $F_t$ is changing from $(F-DF)$ to $(F+DF)$ in a time interval $\frac{1}{2}$ f. As $F_t$ is swept from a stable frequency band through an unstable band of width U, the acoustic instability is being driven for a time $T=U/4fDF$. By the expression "instability being driven", we mean that an undesirable standing wave pattern that will cause for instance bowing or flickering of the arc or plume, has started and is being allowed to grow for the defined time T. In order for the acoustic oscillation within the arc tube to grow to a sufficient amplitude to be deemed an instability, we have estimated that it must be driven for many more than 10 oscillation periods of time duration $1/F$, such that $F \times T >> 10$. Consider a typical unstable band U having a width of about 2 kHz, $f=0.7$ kHz, $DF=4.2$ kHz, and $F=$about 40 kHz, so that $F \times T$ becomes approximately 6. Due to the relative quickness with which F is scanned through the unstable band, the instability is allowed to grow for only 6 oscillations in this example, and its amplitude remains imperceptible. From this analysis, it is apparent that when the sweep rate $(f \times DF)$ becomes too low, the applied frequency is allowed to linger in unstable bands for an excessive time. Therefore there is a lower limit of a few hundred Hz on the modulating frequency f.

We have observed experimentally that a triangular or sawtooth waveform is preferable to sinusoidal for the modulating frequency f. The reason appears to be that as the carrier frequency F is swept from $(F+DF)$ to $(F-DF)$ at a frequency f, the instantaneous rate of sweep is governed by the waveform of f. The triangular or sawtooth waveform provides quick reversals at its positive and negative peaks. This ensures that the instantaneous carrier frequency $F_t$ does not dwell long at the limits $(F+DF)$ and $(F-DF)$. Thus the growth time of undesirable potentially unstable acoustic modes at the limits of the sweep is kept to a minimum.

All of the frequencies are observed to scale inversely with the internal linear dimensions of the arc tube or lamp envelope, requiring higher frequencies for smaller arc tubes and vice versa. The wide stable band designated 44 in FIG. 3 having a width from 30 to 50% of the carrier or center frequency, was obtained in all miniature arc tubes which we tested having volumes of less than 0.3 cubic centimeter. The specific geometric shapes of the envelope, whether sphere, prolate spheroid, or generally cylindrical would only cause variations in the frequency location of the bands, not in their existance.

DESCRIPTION OF PREFERRED CIRCUIT

A circuit that is preferred for operating a xenon-metal halide lamp in accordance with the concepts that have been described is shown schematically in FIGS. 9, 10, 11 and 12 and is briefly described below.

For the convenience of those wishing to study our invention, Table 1 that follows lists the principal components by the same designation as in the drawings, along with a brief description and the source or vendor where appropriate.

TABLE 1

| DESIGNATION | DESCRIPTION | VENDOR |
|---|---|---|
| D5, D8, D12 | fast recovery diode MUR1540 400 V 15 A | MOTOROLA |
| D9, D13 | fast recovery diode UES 1306 | UNITRODE |
| D1, D20, D21, D24 D25, D26, D27, D22 | high speed switching IN4148A | DIODES INC. |
| D3, D4, D19 | fast recovery diode UES 1106 | UNITRODE |
| U1, U2, U3 | comparators TL331 | TEXAS INSTRUMENTS |
| U5, U12 | operational amplifier TL1321 | TEXAS INSTRUMENTS |
| U6 | flip flop dual D MC14013B | MOTOROLA |
| U7, U13 | cmos timer 7555 | INTERSIL |
| U9 | analog switch MC14066CP | MOTOROLA |
| U10 | pulse width modulator UC3843N | UNITRODE |
| U14 | comparator LF356J | |

TABLE 1-continued

| DESIGNATION | DESCRIPTION | VENDOR |
|---|---|---|
| Q1 | N-channel HEXFET IRFP250 | INT. RECTIFIER |
| Q2, Q3 | N-channel HEXFET IRFP350 | INT. RECTIFIER |
| Q4, Q5 | npn transistor 2N2222 | |
| Q6 | pnp transistor 2N2907 | |
| D6, D7, D10, D11 | zener diode 15 v ½ w | |
| D23 | zener diode 6.2 v ½ w | |
| D2, D28 | zener diode 130 v ½ w 1M130Z | MOTOROLA |
| D41 | zener diode 8.2 v | |
| D42, D43, D44 | diodes | |
| R41 | resistor 1 k ½ w 3386P | BOURNS |
| R8 | potentiometer 5 k ¼ w 3386P | BOURNS |
| R25, R22, R31, R47, R13 | potentiometer 10 k ½ w 3386P | BOURNS |
| R49 | potentiometer 100 k ½ w 3386P | BOURNS |
| C2 | 4700 mf 35 v | |
| C3, C4 | capacitor electrolytic 56 mf 200 v 673D | SPRAGUE |
| R43 | potentiometer 50 k ½ W 3386P | BOURNS |
| C1, C33, C18 | capacitor electrolytic 100 mf 25 v | PANASONIC |
| C13, C14, C23, C24 | capacitor .1 mf 50 v CKR05BX 104KR | SFE TECHNOLOGIES |
| C25 | capacitor electrolytic 10 mf 25 v | PANASONIC |
| C15 | capacitor disc 130 pf 1 kv | |
| C28 | capacitor electrolytic 4.7 mf 50 v | PANASONIC |
| C26 | capacitor non-ceramic .002 mf | |
| C20 | capacitor non-ceramic .01 mf | SFE TECHNOLOGIES |
| C22 | capacitor 330 pf | |
| C21, C34 | capacitor .47 mf 50 v CKR06BX47KR | SFE TECHNOLOGIES |
| C35 | capacitor 47 mf, 16 v | |
| C31 | capacitor .033 mf CKR05BX333KR | SFE TECHNOLOGIES |
| C17, C19 | capacitor .0012 mf 100 v CKR0BX122KR | SFE TECHNOLOGIES |
| C16 | capacitor 2.2 mf | |
| C30 | capacitor .15 mf | |
| C27 | capacitor .022 mf | |
| C41, C42 | capacitor 4.7 mf | |
| R9, R10, R42 | resistor carbon film 10 k ¼ w | |
| R6 | resistor carbon film 330 k ¼ w | |
| R7 | resistor carbon film 6.8 k ¼ w | |
| R35 | resistor carbon film 4.7 k ¼ w | |
| R14 | resistor carbon film 2.2 k ½ w | |
| R15 | resistor carbon film 5.6 k ½ w | |
| R3 | resistor 3.9 ohm ½ w | |
| R16 | resistor carbon film 33 k ¼ w | |
| R27 | resistor carbon film 47 k ¼ w | |
| R19 | resistor carbon film 15 k ¼ w | |
| R4, R39, R18, R26 | resistor carbon film 10 k ¼ w | |
| R21, R24 | resistor carbon film 100 k ¼ w | |
| R32 | resistor carbon film 120 k ¼ w | |
| R1, R23, R34, R36 | resistor carbon film 1 k ¼ w | |
| R37, R28, R29, R33 | resistor carbon film 3.9 k ¼ w | |
| R5 | resistor carbon film 6.8 ohm 5% | |
| R38 | resistor 5.1 k ¼ w | |
| R40 | resistor carbon film 390 k ¼ w | |
| R46 | resistor carbon film 2.2 k ¼ w | |
| R48 | resistor carbon film 5.6 k ¼ w | |
| R17 | resistor carbon film 560 k ¼ w | |
| R20 | resistor carbon film 68 k ¼ w | |
| R30 | resistor carbon film 18 k ¼ w | |
| T1 | transformer/inductor 26 turns quadrifilar wound 60 uhys per winding | |
| T4 | pulse transformer PE 63387 | PULSE ENGINEER INC |
| T3, T6, T7 | current transformer 100:1 | |
| L1 | inductor 35 uh | |
| T2 | transformer | SIGNAL TRANSFORMER |
| S1 | toggle switch 20A SPST 90-0002 | McGill |
| R61 | resistor 180 ohms | |

TABLE 1-continued

| DESIGNATION | DESCRIPTION | VENDOR |
| --- | --- | --- |
| R62 | resistor 4.2 M | |
| R63, R71 | potentiometer 1 M | |
| R64, R70 | resistor 100 k | |
| R65, R66, R67 | resistor 2 k | |
| R68, R69 | resistor 470 k | |
| R72 | 9.1 k | |

BALLAST CIRCUIT

The ballast circuit shown in FIGS. 9 to 12 is a two-stage power converter energized from the 12 volt DC supply. The input stage is a DC-to-DC boost converter controlled by feedback from the lamp, while the output stage is a DC-to-AC inverter whose output may be frequency modulated within adjustable ranges. Lamp voltage and current are fed back to the input converter to regulate lamp power. Current through lamp 60 is limited on an instantaneous basis by the linear ballasting inductor L1, while the average power is regulated through the feedback.

Figure 9:
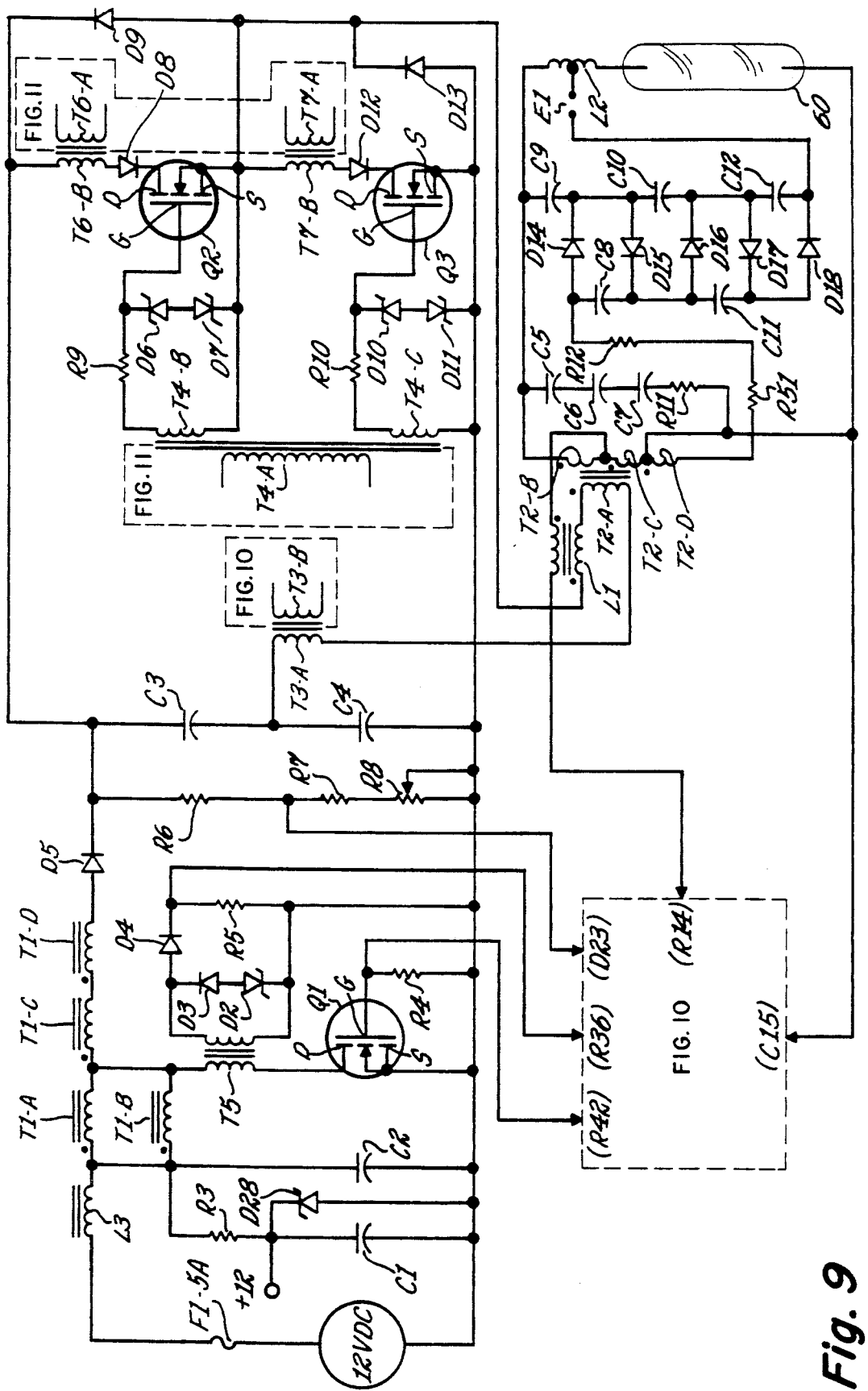
FIGS. 9 to 12 are schematic diagrams of a ballast or circuit suitable for operating miniature xenon-metal halide lamps by the method of our invention. The various parts of the circuit combine in FIG. 9 which may be termed the power mesh.
Figure 10:
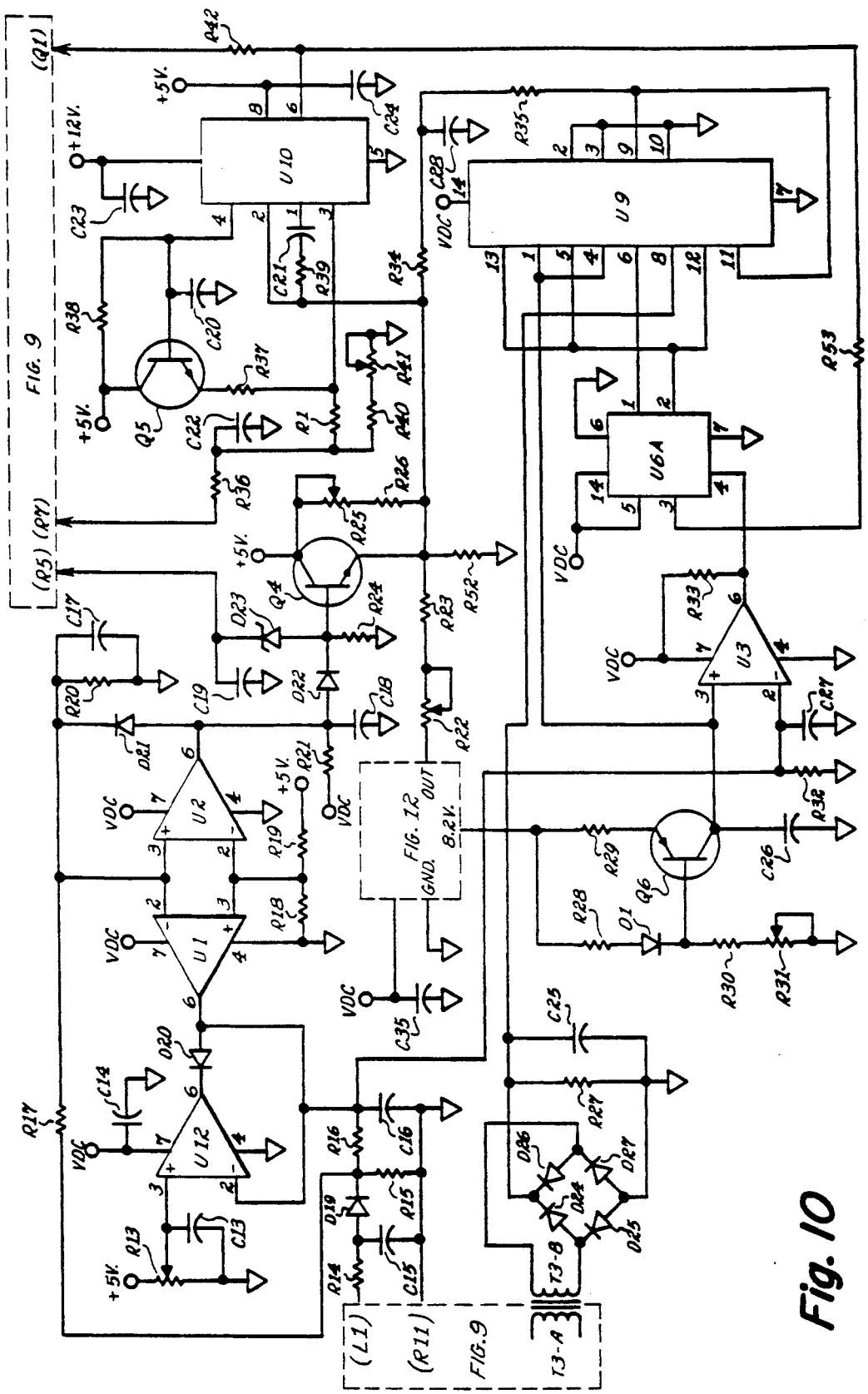

Referring to FIG. 9, the major components of the input converter are inductor L3, transformers T1 and T5, switch transistor Q1, diode D5, and integrated circuit (IC) U10 (shown in FIG. 10) which forms a pulse width modulator (PWM) controller or error amplifier. These components with associated circuitry form a conventional tapped-inductor current-node-controlled, DC-to-DC boost converter.

The control scheme achieves instant light from the lamp by supplying a relatively high wattage to it at turn-on, and ramping the power down, that is reducing power as the lamp warms up. The timer circuit (shown separately in FIG. 12) supplies a ramping current into the summing node of the PWM controller U10. This ramping current is a component of the reference signal that is part of the feedback control which regulates lamp wattage. In FIG. 9, a winding on transformer T2 gives a lamp voltage sample, and current transformer T3 provides a lamp current sample. These two sample signals are amplified through discrete circuit components Q6, U3, U6-A, and U9 shown in FIG. 10, and their associated components, and fed into the above-mentioned summing node. The negative feedback control system acts to balance the scaled lamp volt-amp product with the ramping reference. After warm-up the reference remains constant to maintain a constant run power in the lamp.

Figure 11:
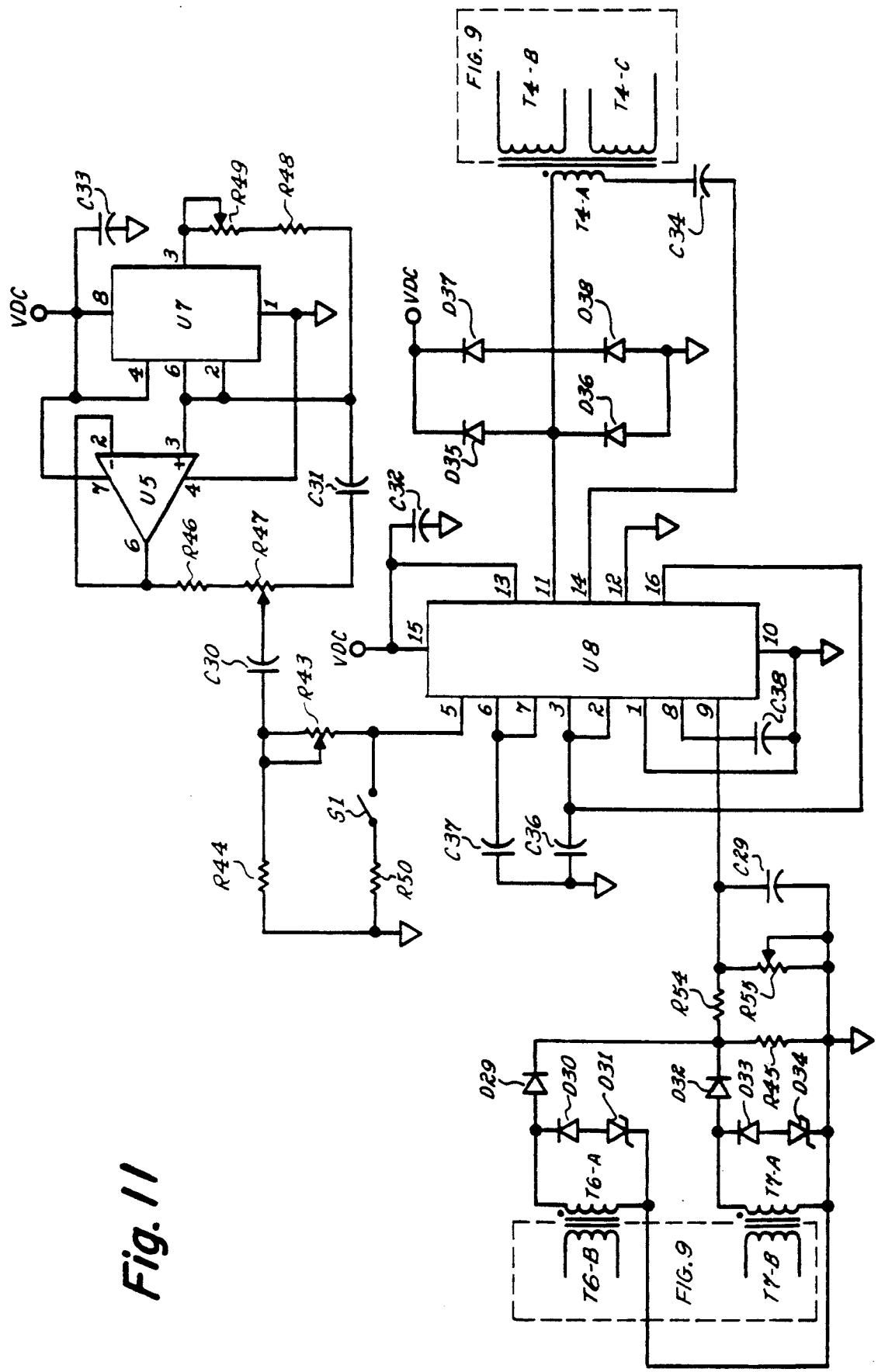
Figure 12:
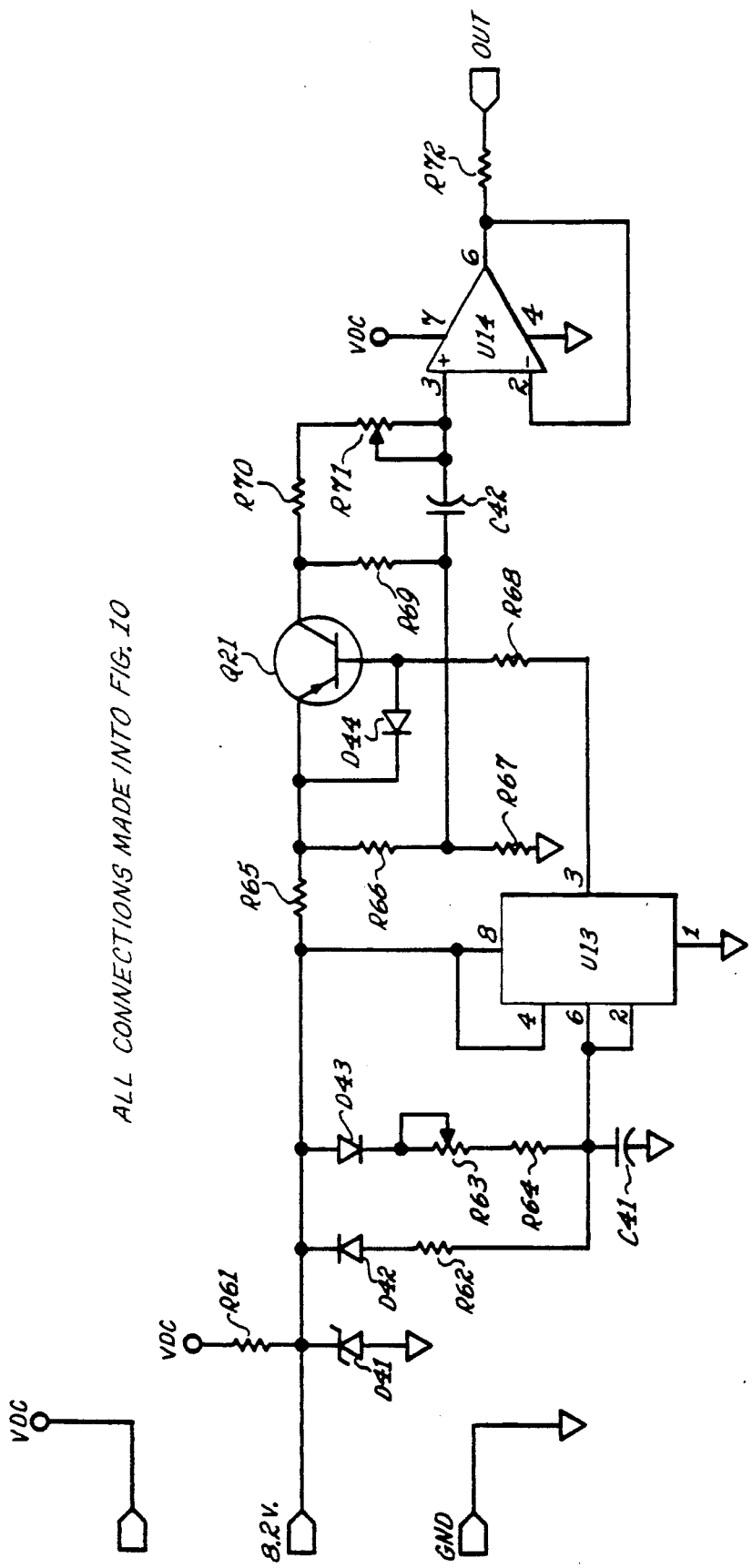

The major components of the output inverter are the transistors Q2 and Q3 in FIG. 9, and drive logic ICs U5, U7, and U8 in FIG. 11. This circuitry includes in its design the feature of frequency modulation of the center frequency. A carrier frequency F, suitably near 55 kHz, is generated by the timer IC U8. This same IC has a modulation signal applied to its frequency-control input terminal (pin 5 of U8 in FIG. 11). The modulation frequency f, suitably near 700 Hz, is generated by similar circuitry connected to IC U7. R43 is a trimmer for the carrier frequency F, R47 is a trimmer for the frequency shift DF, and R49 is a trimmer for the modulation frequency f.

The switch S1 shown connected to pin 5 of U8, is for providing a step change or shift in the carrier frequency F. This frequency shift causes the lamp arc to bend, thereby shifting the location of the light source in a reflector. Such shift can be used to direct the light beam, and thus provide high-beam low-beam switching from a single arc source for automotive applications.

The relatively high voltage needed for initial lamp breakdown and hot restrike of the arc is generated in a five stage diode-capacitor voltage multiplier D14 to D18, and C8 to C12. When the voltage multiplier breaks down the spark gap at E1, the step-up coil L2 (FIG. 9) generates a high voltage that breaks down the gap in lamp 60.

The timer mentioned for supplying a ramping reference to the power feedback control loop has a delay feature whereby the ramp down begins only after an initial delay period during which the timer output is maintained at a high level. This delay feature improves the instant light performance. The capacitors C41 and C42 determine the delay time and ramp rate. By way of example, we have used a power level 4 times the steady-state level for instant light, hold it for approximately 1 second, then allow it to fall back exponentially to the steady-state level.

By suitable adjustment or modification of the circuit components, a frequency modulated carrier output may be generated in the range of 10 to 200 kHz, together with a frequency deviation or swing DF up to 30% of F, and a modulation rate or frequency f of up to 5% of F. The waveshape is a composite intermediate sinusoidal and triangular, with a crest factor less than 2:1.

The foregoing is but one example of a ballasting circuit suitable for operating lamps in accordance with our invention in order to acoustically straighten the arc and improve the isothermal condition of the lamp envelope, or in order to change the degree of bending of the arc and shift its position.

What is claim as new and desire to secure by Letters Patent of the United States is:

1. A method of operating a miniature high pressure metal vapor discharge lamp of a kind comprising:
   a vitreous envelope defining a discharge space having a volume not exceeding approximately 1 cubic centimeter,
   a pair of electrodes sealed into the envelope and defining an arc gap,
   and a fill comprising mercury, metal halides and a radiation-emitting gas in a quantity exerting a partial pressure of at least 25% of the total vapor pressure during continuous operation,
   which method consists in:
   forcing a current having an alternating component causing instantaneous variations in input power across the electrode gap,
   said variations in power being at a frequency selected in a preferred band within the range from 20 kHz to 200 kHz,
   said band being one in which acoustic resonance excites arc-straightening modes which reduce the effects of gravity-induced convection in the fill.

2. The method of claim 1 wherein said preferred band is one in which acoustic resonance excites a mode effective to reduce gravity-induced bowing of the arc, lower the hot spot temperature, and raise the cold spot temperature of the lamp.

3. The method of claim 1 wherein the current is alternating with a waveshape which assures time-fluctuations of input power at said selected frequency.

4. The method of claim 1 wherein the alternating component of the current through the lamp at said selected frequency is frequency-modulated in order to broaden the width of the band of frequencies in which a straight and stable arc is obtained.

5. The method of claim 1 practiced on a lamp of said kind which defines a generally prolate-spheroid discharge space and wherein the electrodes define a horizontal arc gap parallel to the major axis.

6. The method of claim 1 practiced on a lamp of said kind wherein the electrodes define a horizontal arc gap parallel to the major axis, and wherein the radiation-emitting gas is xenon in a quantity exerting a partial pressure comparable to that of the mercury during continuous operation.

7. The method of claim 1 practiced on a lamp of said kind wherein the electrodes define a horizontal arc gap parallel to the major axis, wherein the radiation-emitting gas is xenon in a quantity exerting a partial pressure comparable to that of the mercury during continuous operation, and wherein sodium is included as a halide.

8. The method of claim 1 wherein the radiation-emitting gas is xenon, and wherein said alternating component may be shifted in frequency between two bands, one band being an arc-straightening band, and the other being a band allowing some arc-bowing with attendant spatial displacement of the light concentration in said lamp.

9. A method of operating a miniature high pressure metal vapor discharge lamp of a kind comprising:
   a vitreous envelope defining a discharge space having a volume not exceeding approximately 1 cubic centimeter,
   a pair of electrodes sealed into the envelope and defining an arc gap,
   and a fill comprising mercury, metal halides, and xenon gas in a quantity exerting a partial pressure of at least 25% of the total vapor pressure during continuous operation;
   which method consists in:
   forcing a current having an alternating component causing instantaneous variations in input power across the electrode gap,
   said variations in power being at a frequency F selected as a center frequency in a preferred band within the range from 20 kHz to 200 kHz,
   said band being one in which acoustic resonance excites arc-straightening modes which reduce the effects of gravity-induced convection in the fill,
   said center frequency F being frequency modulated in order to broaden the width of said band,
   said frequency modulation being with a frequency deviation DF at a modulating frequency f, DF and f being chosen to maximize the width of said band.

10. The method of claim 9 wherein the frequency deviation is from 7 to 20% of the center frequency F, and the modulating frequency is from 1 to 5% of the center frequency F.

11. The method of claim 9 wherein the frequency deviation is from 7 to 20% of the center frequency F, the modulating frequency is from 1 to 5% of the center frequency F, and the waveform of the modulating frequency envelope inclines to triangular or sawtooth rather than sinusoidal.

12. The method of claim 9 practiced on a lamp of said kind wherein the electrodes define a horizontal arc gap parallel to the major axis, wherein the xenon exerts a partial pressure comparable to that of the mercury during continuous operation, and wherein sodium is included as a halide.

13. In combination, a miniature high pressure metal vapor discharge lamp of a kind comprising:
   a vitreous envelope defining a discharge space having a volume not exceeding approximately 1 cubic centimeter,
   a pair of electrodes sealed into the envelope and defining an arc gap,
   and a fill comprising mercury, metal halides, and xenon gas in a quantity exerting a partial pressure of at least 25% of the total vapor pressure during continuous operation,
   and means for operating said lamp comprising a source of current connected across said electrodes, said current having an alternating component causing instantaneous variations in input power across the electrode gap,
   said variations in power being at a frequency selected in a preferred band within the range from 20 kHz to 200 kHz,
   said band being one in which acoustic resonance excites arc-straightening modes which reduce the effects of gravity-induced convection in the fill.

14. The combination of claim 13 wherein said preferred band is one in which acoustic resonance excites a mode effective to reduce gravity-induced bowing of the arc, lower the hot spot temperature, and raise the cold spot temperature of the lamp.

15. The combination of claim 13 wherein the electrodes define a horizontal arc gap parallel to the major axis, the xenon is in a quantity exerting a partial pressure comparable to that of the mercury during continuous operation, and wherein sodium is included as a halide.

16. The combination of claim 13 wherein the current from said source is alternating with a waveshape which assures time-fluctuations of input power at said selected frequency.

17. The combination of claim 13 wherein the alternating component of the current through the lamp causing said power variations at said selected frequency is frequency-modulated in order to broaden the width of the band of frequencies in which a straight and stable arc is obtained.

18. The combination of claim 13 wherein the envelope of said lamp defines a generally prolate-spheroid discharge space, and wherein the electrodes define a horizontal arc gap parallel to the major axis.

19. In combination a miniature high pressure metal vapor discharge lamp of a kind comprising:
   a vitreous envelope defining a discharge space having a volume not exceeding approximately 1 cubic centimeter,
   a pair of electrodes sealed into the envelope and defining a horizontal arc gap,
   and a fill comprising mercury, metal halides including sodium, and xenon gas in a quantity exerting a partial pressure of at least 25% of the total vapor pressure during continuous operation;

and means for operating said lamp comprising a source of current connected across said electrodes, said current having an alternating component causing instantaneous variations in input power across the electrode gap, said variations in power being at a frequency F selected as a center frequency in a preferred band within the range from 20 kHz to 200 kHz, said band being one in which acoustic resonance excites arc-straightening modes which reduce the effects of gravity-induced convection in the fill, said center frequency F being frequency modulated in order to broaden the width of said band, said frequency modulation being with a frequency deviation DF at a modulating frequency f, DF and f being chosen to maximize the width of said band.

20. The combination of claim 19 wherein the frequency deviation DF is from 7 to 20% of the center frequency F, and the modulating frequency f is from 1 to 5% of the center frequency F.

21. The combination of claim 19 wherein the frequency deviation is from 7 to 20% of the center frequency F, the modulating frequency f is from 1 to 5% of the center frequency F, and the waveform of the modulating frequency envelope inclines to triangular or sawtooth rather than sinusoidal.

22. The combination of claim 19 including a headlamp reflector in which said lamp is located, and switch means for step-shifting the carrier frequency from a controlled arc-bowing region to an arc-straightening band, whereby to physically displace the light concentration in said lamp to effect beam-switching.

* * * * *